United States Patent Office 3,371,065
Patented Feb. 27, 1968

3,371,065
POLYMERS OF OXETAN-3-ONE
Robert Neal MacDonald, Wilmington, Del., assignor to E. I. du Pont de Nemours and Company, Wilmington, Del., a corporation of Delaware
No Drawing. Filed Nov. 2, 1964, Ser. No. 408,321
18 Claims. (Cl. 260—63)

ABSTRACT OF THE DISCLOSURE

Oxetan-3-one is polymerized to high molecular weight homopolymer at a temperature of −20° C. to +100° C. in the presence of cationic catalysts. Under these conditions, copolymers are formed with suitable comonomers such as aldehydes, ketones, cyclic ethers, cyclic esters and ethylenically unsaturated compounds. The polymers are useful in the form of tough fibers, self-supporting and scratch-resistant films.

Description of the invention

This invention relates to, and has as its principal objects provision of, polymers, including both homopolymers and copolymers, of oxetan-3-one and a process for the preparation of the same.

The formula of the compound oxetan-3-one,

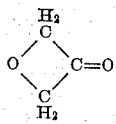

is given by Marshall and Walker, J. Chem. Soc. 1952, 467, who did not isolate the compound but did isolate and characterize its 2,4-dinitrophenylhydrazone derivative. No polymers of the compound have been described heretofore although, of course, the formation of polymeric ethers via the ring-opening polymerization of cyclic oxide monomers in the presence of cationic (Lewis acid) catalyst is well known, e.g., the synthesis of polyoxymethylene from trioxane or that of polyoxyethylene from ethylene oxide.

In accordance with the present invention, there are now provided homopolymers and copolymers of oxetan-3-one by cationic polymerization of this monomer alone or, in the case of copolymers, admixed with suitable other copolymerizable monomers. All of the polymers are characterized by having in linear formation a plurality of the recurring units.

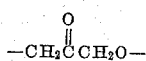

referred to here as the oxetan-3-one unit. In the case of homopolymers, this unit alone is present except for a few possible alternative units and modifying linkages derivable through intercession of the carbonyl group, e.g., oxetanoxy units

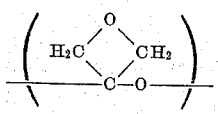

and hemiketal or carbon-carbon double bond linkages. Oxetanoxy units can occur as the result of partial polymerization through the carbonyl group (Example 5) and hemiketal or carbon-carbon double bond linkages can occur through crosslinking reactions.

In the case of copolymers, besides oxetan-3-one units, units derived from suitable comonomers are also present. Comonomers suitable in the present invention include aliphatic aldehydes, e.g., formaldehyde, acetaldehyde, acrolein; cyclic oligomers of aliphatic aldehydes, e.g., trioxane, paraldehyde, cyclic tetraoxymethylene, metaldehyde; epoxides, e.g., propylene oxide, tetramethylethylene oxide, styrene oxide, butadiene monoxide; oxetanes, e.g., oxetane itself, 3,3-bis-(chloromethyl)oxetane, spirooxetanes [cf. Campbell and Foldi: J. Org. Chem., 26, 4654 (1961)]; cyclic formals, e.g., 1,3-dioxolane, 1,3-dioxane, 4-chloromethyl-1,3-dioxolane, pentaerythritol diformal; oxacyclopentanes, e.g., tetrahydrofuran; cyclic esters, e.g., β-propiolactone, γ-butyrolactone, ε-caprolactone, pivalolactone, glycolide, lactide; and vinyl compounds which can be polymerized by a cationic catalyst, e.g., propylene, isobutylene, styrene, α-methylstyrene, divinyl benzene, acenaphthylene, acrylonitrile, methyl acrylate, methyl methacrylate, N-vinylcarbazole, 1,3-butadiene, isoprene, 2-chloro-1,3-butadiene, methyl vinyl ether, isobutyl vinyl ether. Preferred comonomers are formaldehyde, trioxane and oxetane. While the proportions of the units in the copolymers may vary widely, preferred copolymers contain from around 2 to 98% by weight of the oxetan-3-one unit.

In its process aspect, the invention comprises polymerizing the oxetan-3-one alone or mixed with a comonomer at a temperature in the range of about −20° C. to about +100° C. in the presence of a cationic catalyst. Temperatures of about −20° to 60° C. are preferred for the synthesis of homopolymer while 30–100° C. is generally preferred for the synthesis of copolymers.

Pressure is not critical in the process and may be atmospheric or above or below atmospheric. A solvent or a non-solvent diluent may be optionally used but any such material should be inert to the polymerization catalyst. In particular, however, moisture should be excluded from the reactants. Reaction time is not critical and, depending to some extent on the activity of the reactants and concentration of catalyst, may vary from seconds to hours. Proportions of monomers are likewise not critical but in general oxetan-3-one will comprise 1–100% by weight of the monomer employed.

Any of the usual cationic (Lewis acid) catalysts used, for example, in formaldehyde polymerizations can be employed in this invention. Suitable catalysts include boron trifluoride, triethyloxonium fluoborate, stannic chloride, aluminum chloride, phosphorus pentafluoride, antimony pentachloride, antimony pentafluoride and benzoyl hexafluoroantimonate-($C_6H_5COSbF_6$). Boron trifluoride ($BF_3$; advantageously as the etherate,

$BF_3.C_4H_{10}O$)

triethyloxonium fluoborate and stannic chloride are preferred catalysts. The weight of catalyst generally employed is about 0.01 to 2.0 percent based on the weight of total monomer.

In practice, the monomer or monomers and catalyst are mixed and maintained for a desired time under anhydrous conditions in a suitable reactor. The solid polymeric product is then removed with filtering and washed and dried as will be evident to those skilled in the chemical arts.

The polymeric products of this invention are solids that have, in general, the properties of polyacetals or polyethers and can be cured by crosslinking through carbonyl groups.

The homopolymers are, in general, white-to-brown solids infusible up to their decomposition point (ca. 300° C.). They are soluble in s-dichlorotetrafluoroacetone hydrate and are film forming (by solvent casting). The films are flexible but sometimes tacky. Their structure is linear and contains ether linkages and carbonyl groups in the chain, as shown by infrared absorption at 3.4–3.45μ (indicative of saturated —C—H), 5.75–5.77μ (indicative of open chain carbonyl, C=O), and 8–10μ (indicative of ether linkage, —C—O—). In some instances, weak infrared absorption is shown at about 2.90μ (indicative of hydroxyl, —OH) and at 6.0 to 6.1μ (indicative of —C=C—), these spectral bands being attributed to the presence of hemiketal and unsaturated linkages formed through interchain reactions. Any increase in ether linkage absorption accompanied by a decrease in carbonyl absorption is attributed to presence of oxetanoxy units formed by partial polymerization through the carbonyl group.

The copolymers are also solid but generally white-to-yellow in color. They are fusible with a melting point around 100–200° C. depending on composition. They are fiber forming (drawable from melt), film forming (by pressing or solvent-casting) and soluble in s-dichlorotetrafluoroacetone hydrate or p-chlorophenol. They are of linear structure containing opened oxetan-3-one segments

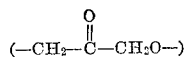

and comonomer segments (e.g., polyoxymethylene from trioxane), as shown by I.R. absorption.

There follow some nonlimiting examples in which quantities are expressed in parts by weight and reduced pressures in mm. of mercury.

EXAMPLE A

Synthesis of oxetan-3-one monomer

A mixture of 350 parts of ether, 350 parts of water, 0.5 part of osmium tetroxide and 41 parts of 3-methyleneoxetane [Kleinfeller et al., C.A. 23, 4928 (1929); Applequist et al., C.A. 51, 239 (1957)], was cooled to 0° C. with stirring. Sodium metaperiodate (258 parts) was then added to the well stirred mixture at 0° C. over a period of 1.5 hours, the mixture was stirred and kept at 0° C. for an additional hour, and it was finally allowed to come to room temperature where it remained while stirring was continued for 70 hours. At the end of this period, the ether layer was decanted. The separate aqueous phase was filtered to remove precipitated sodium iodate, and the iodate was washed by decantation with five successive 133-part portions of methylene chloride. The methylene chloride washes were combined and used for extraction of the aqueous filtrate in a continuous extractor for 48 hours. The methylene chloride and ether solutions were then combined and dried over anhydrous magnesium sulfate. The dry mixture was concentrated by distillation at atmospheric pressure to a black residue of 60 parts. The residue was evaporated under a pressure of 10 mm. into a trap immersed in a bath at —78° C., and the condensate in the trap was distilled at 150 mm. to yield 16 parts of pale yellow liquid, B.P. 58–60° C.

The yellow liquid was identified as oxetan-3-one by infrared analysis (absorption at 5.44μ and 10.38μ, indicative respectively of carbonyl and ether oxygen), by nuclear magnetic resonance determination (single peak at 4.48t) and by elemental analysis.

Analysis for $C_3H_4O_2$. Calc'd: C, 50.00; H, 5.56. Found: C, 49.86; H, 5.80.

The identification was confirmed by preparation of the 2,4-dinitrophenylhydrazone derivative, obtained as yellow needles, M.P. 152–153° C., after two recrystallizations from ethanol (cf. Marshall and Walker, J. Chem. Soc. 1952, 467–475, who report the 2,4-dinitrophenylhydrazone, M.P. 152–155° C.).

Analysis for $C_9H_8O_5N_4$. Calc'd: C, 42.86; H, 3.20; N, 22.22. Found: C, 42.67; H, 3.00; N, 21.94.

EXAMPLE 1

Bulk polymerization of oxetan-3-one (A) A glass tube 150 mm. long and 8 mm. in diameter, closed at one end and equipped with a side arm, was dried several hours in a circulating air oven at 120° C. The tube was cooled, flushed with nitrogen, fitted with a serum cap at the end, and kept free of atmospheric moisture by a flow of nitrogen through a T-joint attached to the side arm. Oxetan-3-one (0.295 part) was introduced by means of a hypodermic syringe and the tube was cooled in a bath at —65° C., at which temperature the oxetanone was solid. Boron trifluoride etherate ($BF_3 \cdot C_4H_{10}O$; 0.0034 part) was then added by means of a micro-syringe. The etherate solidified and remained suspended on the cold wall of the tube.

The bath was warmed to +5° C., causing the oxetanone in the bottom to liquefy, and the clear liquid monomer was brought into contact with the etherate by tilting the tube so that a portion of the catalyst was washed into the liquid monomer. At this juncture the liquid became cloudy and viscous, and rapidly spreading solidification started at the surface accompanied by bubbling and darkening. The mixture was quickly cooled to —10° C. and then was allowed to warm to room temperature, no further activity being observed. The light tan solid polymeric product was removed from the tube, washed with methanol, air-dried and found to be infusible on a copper block heated gradually to 300° C. Darkening occurred at 270° C. The solid weighed 0.15 part after being dried overnight under vacuum.

Infrared absorption, determined on a wafer formed of a finely-ground mixture of the product and potassium bromide, showed significant peaks at 5.75μ (attributed to carbonyl), at 9.05μ and 9.5μ (attributed to ether oxygen), and at 3.4μ (attributed to C—H bonds). Infrared absorption of the product in a mineral oil mull showed peaks at 2.90μ, 5.75μ, 6.06μ and 6.10μ, with a broad band at 8–10μ. An X-ray diffraction pattern of a powder sample indicated the polymer to be amorphous.

Analysis for $C_3H_4O_2$. Calc'd: C, 50.00; H, 5.56. Found: (Avg. of 2) C, 48.06; H, 6.17.

(B) The foregoing preparation of oxetan-3-one polymer was repeated with 0.295 part of oxetanone and 0.0023 part of boron trifluoride etherate, except that a different temperature schedule was employed. The monomer was cooled initially to —10° C.; coolant was removed and the temperature was permitted to rise to —5° C. whereupon in 3 to 5 minutes the monomer catalyst mixture was observed to become cloudy and white; the fluid mixture was re-cooled to —15° C.; and after again removing the coolant a rise to —7° C. occurred in 8 minutes as the mixture became thoroughly solid. The reaction mixture was allowed to warm further, and after 30 minutes at room temperature, the mass of polymer had turned brown and contained bubble voids below a clear, colorless, tough strip of film which adhered to the wall of the tube. A sample of the clear portion darkened without melting on a copper block gradually heated to 300° C. The total product weighed 0.27 part after being washed and dried. It was soluble in s-dichlorotetrafluoroacetone hydrate, showing an inherent viscosity of 0.17 at 0.1% concentration and 25° C. [cf., Cragg, J. Colloid Sci. 1, 261 (1946)].

Analysis for $C_3H_4O_2$. Calc'd: C, 50.00; H, 5.56. Found: Avg. of 4) C, 48.06; H, 5.88.

EXAMPLE 2

Polymerization of oxetan-3-one in heptane

Oxetan-3-one (0.12 part) and n-heptane (0.21 part) were placed in a small vial, the system was flushed with nitrogen, and the vial was closed with a serum cap. To the two-layered mixture was added at room temperature 0.0023 part of boron trifluoride etherate via a micro-syringe. Instantaneous exothermic polymerization occurred in the bottom layer, with formation of a dark amber solid having light-colored to white edges. A small amount of methanol was added to consume and dissolve the catalyst, and after decantation of the liquid portion of the mixture a hard lump of light-colored solid polymer remained. The lump was broken into particles and mixed with s-dichlorotetrafluoroacetone hydrate. After standing overnight in this solvent, some of the polymer had dissolved to form a viscous solution. A portion of the solution was flowed onto a glass plate, and the film which remained after evaporation of the solvent at room temperature was finally dried in a vacuum oven at 70° C. The dried film, which was transparent and scratch resistant, showed infrared absorption peaks at $2.91\mu$, $3.42\mu$, $5.75\mu$ and $6.1\mu$, and a band at $8.5$–$9.5\mu$. The absorption peaks at 2.91 and $6.1\mu$ were greater than in the case of the product of Example 1(A). A 1-mil film, prepared as above, was clear and flexible.

EXAMPLE 3

*Polymerization of oxetan-3-one in ether*

Oxetan-3-one (1.18 parts) and sodium-dried ether (7.1 parts) were placed by means of hypodermic syringes into a 25-ml. flask under nitrogen, and the resultant solution was cooled to −20° C. Boron trifluoride etherate (0.024 part) was added in three portions over a period of 12 minutes while the temperature of the cooling bath rose to −9° C. There was no outward appearance of polymerization activity during the addition of boron trifluoride. As the solution was being stirred overnight at room temperature, however, a light tan friable solid separated from the ether and a clear, flexible film formed on the wall of the flask above the ether. The film became stiff and springy at first as it dried on a gradually heated copper block, then it crumbled at 210° C., darkened at 230° C. and charred at 280–300° C. The friable solid was filtered, washed with methanol and dried overnight at 70° C. in a vacuum oven to yield 0.27 part of polymer.

Analysis for $C_3H_4O_2$. Calc'd: C, 50.00; H, 5.56; O, 44.44. Found: C, 50.00; H, 6.33; O, 41.81.

The friable polymer was soluble in s-dichlorotetrafluoroacetone hydrate showing an inherent viscosity of 0.09 at 0.1% concentration and 25° C. Infrared analysis showed absorption peaks at $2.92\mu$, $3.45\mu$, $5.77\mu$ and $6.15\mu$, and a broad band at $9.0$–$9.5\mu$. In the copper block test it coalesced somewhat at 170° C., turned light tan at 210° C., became brown and felt-like at 265° C., and embrittled with further darkening at 310° C. Thermogravimetric analysis [Vassalo, Anal, Chem. 33, 1823 (1961)] programmed at a heating rate of 6° C. per minute starting at 25° C. showed percentages of polymer remaining at ascending temperatures as follows:

| Temp., ° C.: | Percent polymer residue |
|---|---|
| 100 | 98.3 |
| 150 | 94.2 |
| 200 | 88.5 |
| 250 | 80.5 |
| 300 | 62.0 |
| 350 | 48.2 |

An air-dried 1-mil film, cast from a solution of the friable solid in s-dichlorotetrafluoroacetone hydrate containing 2% triethylamine, retained a tackiness which nearly disappeared when the film was dried in a vacuum oven at 40° C. but returned when the film was exposed to the air at room temperature.

EXAMPLE 4

*Polymerization of oxetan-3-one in benzene*

Oxetan-3-one (0.10 part) and dry benzene (0.53 part) were placed in a vial under nitrogen, the system was closed with a serum cap, and 0.011 part of stannic chloride was injected by means of a microsyringe. During five minutes at room temperature, the reaction mixture became cloudy and gel particles of polymer appeared on the wall of the vial which was then placed in a bath at 55° C. for five minutes, during which cloudiness and gel formation increased. The vial was removed from the bath, 0.18 part of methanol was injected, the mixture was shaken thoroughly, the vial was opened, and clarified supernatant benzene was decanted. The polymeric product remained as a solid attached to the wall of the vial. It was washed three times in situ with methanol (total, 4.8 parts) and then dried overnight in a vacuum oven at 45° C. The dried product (weight, 0.01 part) did not melt on a metal block heated gradually to 300° C.; and the infrared absorption pattern, with bands at $3.41\mu$, $6.85\mu$, $7.36\mu$ and $7.90\mu$ (C—H bonding), at $5.76\mu$ (C=O) and at $9$–$9.5\mu$ (—C—O—) indicated a chain structure containing carbonyl groups and hydrocarbon-ether linkages.

EXAMPLE 5

*Polymerization of oxetan-3-one with triethyloxonium fluoborate catalyst*

(A) When 0.02 part of triethyloxonium fluoborate $[(C_2H_5)_3OBF_4]$ was dissolved in 2.4 parts of oxetan-3-one, a clear solution resulted. It was cooled to −78° C. after 5 minutes and then let warm to room temperature. At 20 minutes a violent polymerization occurred which gave charred polymer.

(B) Oxetan-3-one (11.8 parts) was dissolved in 134 parts of methylene chloride under anhydrous conditions in a nitrogen atmosphere and the solution was cooled to −72° C. To the cold solution was added 0.06 part of triethyloxonium fluoborate dissolved in 1.3 parts of methylene chloride. After 10 minutes at −72° C. the solution was warmed gradually to 26° C. over a period of 30 minutes and then to 35° C. at about the same rate. After 5 minutes at 35° C. the solution was let stand at room temperature. At 22 hours the mixture was dark salmon in color and after 3 days it had become milky and tan colored. The system had become an almost colorless gel in about a month, and on the thirty-eighth day it was treated with ammonical methanol to deactive the catalyst. The gel turned deep yellow, it was broken up in several volumes of methanol and allowed to settle, the methanol was decanted, and the residue was dried at 50° C. overnight in a vacuum oven.

The resultant friable, light orange-tan product (5.65 parts) was insoluble at 100° C. in sym-dichlorotetrafluoroacetone hydrate, hexamethylphosphoramide, or dimethylformamide. It did not melt but turned black and crisp at about 315° C. on a heated metal block. The polymer showed infrared absorption at 2.90, 3.45, 5.79, 6.12, 6.90, 7.26, 7.63, 7.95, 8.25, 8.49, 9.60, 11.15 sh., 11.40, 12.55, and $12.90\mu$. In comparison with the polymer of Example 1(A), infrared adsorption attributable to carbonyl at $5.79\mu$ was much less and absorption attributable to possible oxybutane rings at $9.60\mu$ was relatively greater, indicating that appreciable polymerization had occurred through the carbonyl group.

EXAMPLE 6

*Bulk copolymerization of oxetan-3-one and trioxane*

A mixture of 0.08 part of oxetan-3-one and 5.0 parts of trioxane in a 150 mm. x 18 mm. test tube provided with a capillary tube to the bottom was heated in an oil bath at 80° C. as nitrogen was bubbled slowly through the molten mass via the capillary. When temperature equilibrium was attained, the capillary tube was raised above the liquid and 0.011 part of boron trifluoride etherate was separately injected into the test tube. Immediate solidification at the surface took place when the etherate touched the trioxane/oxetanone mixture. The capillary tube was then pushed through the crust to renew the nitrogen bubbling from the bottom. Within about 2 minutes the liquid mixture became cloudy and solid throughout. The test tube was removed from the oil bath at seven minutes after the introduction of the catalyst. The mass of polymer was white except for a yellow section near the top. The white polymer showed a melting point at 171–172° C. on a gradually heated copper block, and when a fresh portion was put on the block at 185° C. filaments as long as 2 feet could be drawn from the melt by means of a spatula. These filaments were of fine denier, and were qualitatively strong and flexible. After it was dried overnight at 50° C. in a vacuum oven, the polymer weighed 3.0 parts. Elemental analysis corresponds to that of a copolymer containing about 4.5% by weight of oxetan-3-one.

Analysis for 95.5/4.5 $CH_2O/C_3H_4O_2$. Calc'd: C, 40.45; H, 6.62. Found: C, 40.45; H, 6.81.

The copolymer was soluble in s-dichlorotetrafluoroacetone (inherent viscosity 0.15 at 25° C. and 0.1% concentration) and in a 98/2 mixture of p-chlorophenol/α-pinene (inherent viscosity 0.1 at 60° C. and 0.5% concentration). The melting point by differential thermal analysis [Vassalo and Harden, Anal. Chem. 34, 132 (1962)] was initially determined to be 167° C.; and after four months a redetermination indicated it to be 173° C. For comparison, by the same method of determination, high molecular weight polyoxymethylene showed a melting point of 172° C. Infrared analysis showed absorption peaks at 3.34μ and 3.42μ (aliphatic C—H), at 5.75μ (carbonyl), and at 6.79μ, 6.97μ, 7.22μ, 8.07μ, 9.10μ, 10.70μ, and 11.10μ (oxymethylene chain).

EXAMPLE 7

*Copolymerization of oxetan-3-one and trioxane in heptane*

A 50-ml. flask equipped with a reflux condenser, a thermometer, a magnetic stirrer, a serum-cap inlet and a nitrogen inlet was oven-dried at 120° C. With serum cap in place and nitrogen flowing to maintain an inert atmosphere, there were introduced separately 1.18 parts of oxetan-3-one, 2 parts of trioxane and 6.8 parts of n-heptane, and the mixture was then stirred and heated to 45° C. At this point 0.011 part of boron trifluoride etherate was introduced and heating was continued to a temperature of 70° C. in 15 minutes, whereupon polymerization began. The temperature was reduced to 60° C. in the next 15 minutes and maintained there for an additional 30 minutes. The mixture was then allowed to cool to room temperature and allowed to stand for two days. The reaction mixture was filtered, the nearly white solid was washed with 258 parts of petroleum ether, and the washed product was dried overnight in a vacuum oven at 50° C. The yield of dried polymer was 1.4 parts. The polymer was found to soften at 100° C. and to melt at 110° C. on a gradually heated copper block. The observed melting point by differential thermal analysis was 113° C. A self-supporting 3.5-mil film made in a press at 80° C. under 500 lb./sq. in. pressure was limp and translucent. Elemental analysis corresponds to that of a copolymer containing 53% by weight of oxetan-3-one.

Analysis for 53/47 $C_3H_4O_2/CH_2O$. Calc'd: C, 45.30; H, 6.08. Found: C, 45.30; H, 5.86.

Infrared analysis showed absorption peaks at 5.75μ (carbonyl), at 3.36μ, and 3.44μ (aliphatic C—H), and at 6.8μ 6.98μ, 7.22μ, 8.07μ, 9.10μ and 10.73μ (oxymethylene chain). The copolymer was soluble in s-dichlorotetrafluoroacetone hydrate, showing an inherent viscosity of 0.68 at 0.1% concentration and 25° C. In isothermal gravimetric analysis, the polymer showed a weight loss of 37% on being heated to 222° C., at which temperature thermal decomposition rate constants ($k_{222}$), i.e., percent loss per minute, were determined for the remaining polymer:

| $k_{222}$: | Wt. loss range, percent |
| --- | --- |
| 0.6 | 100–68 |
| 0.2 | 68–63.6 |
| 0.07 (1.5 hour heating period) | 63.6–59.5 |

A film of this polymer cast on glass from s-dichlorotetrafluoroacetone hydrate was baked in a vacuum oven at 135° C. for 9 hours to give a hard, strongly adherent, scratch-resistant coating which was infusible at 135° C., insoluble in s-dichlorotetrafluoroacetone hydrate and unaffected by 24-hour immersion in water. These tests demonstrate thermal crosslinking of the polymer and its utility in thermoset finishes.

EXAMPLE 8

*Copolymerization of oxetan-3-one and formaldehyde in benzene*

Into a glass reactor, previously dried at 120° C. in an air-oven, were placed 44 parts of silica-gel-dried benzene and 0.089 part of stannic chloride. The system was protected from the atmosphere with a blanket of nitrogen. As the solution was stirred and heated in a bath held at 66–70° C., 11.6 parts of anhydrous gaseous formaldehyde generated by pyrolysis of cyclohexyl hemiformal (cf. U.S. 2,848,500) was passed into the top of the reactor at a rate of 0.77 part per minute and, simultaneously, a solution of 2.4 parts of oxetan-3-one in 8.8 parts of dry benzene was added dropwise from a nitrogen-protected dropping funnel over the 15-minute addition period. The temperature of the polymerization system was 52–67° C. during the addition.

Stirring was continued for five minutes after addition of the ingredients, then 16 parts of methanol was added and stirring continued an additional 10 minutes. The slurry was filtered, and the polymer (A) recovered was washed with 176 parts of benzene followed by 396 parts of methanol and dried overnight at 50° C. in a vacuum oven. The gel which adhered to the wall of the reactor (polymer B) was removed, washed with 176 parts of benzene followed by 158 parts of methanol, and dried overnight at 50° C. in vacuo. There was obtained 2.4 parts of A and 0.7 part of B. Polymer A decomposed below 100° C. on a gradually heated metal block and showed a decomposition temperature of 63° C. on a hot stage microscope, but fresh material placed on the block at 165–168° C. could be pressed into a film. Polymer B exhibited a melting point of 163–166° C. on a hot stage microscope and could be pressed to a film when placed on a metal block at 165–170° C. Both A and B showed absorption in the infrared at 5.77μ (C=O) and in the regions attributable to C—H and C—O (as in polyoxymethylene). Elemental analysis did not elucidate the exact copolymer composition, but the presence of carbonyl and the melting point data point to a copolymer of formaldehyde and ring-opened oxetan-3-one.

EXAMPLE 9

*Copolymerization of oxetan-3-one and isobutylene in toluene*

A solution of 1.2 parts of oxetan-3-one and 1.2 parts of isobutylene in 4.3 parts of toluene was cooled to −10° C. under a blanket of nitrogen, and 0.06 part of boron trifluoride etherate was then introduced. After 5 minutes 4 parts of methanol was added to deactivate the catalyst and cause coagulation of polymer. The coagulum was separated, washed with methanol in a centrifuge and dried 4 hours at 50° C. in a vacuum oven. The resultant dry copolymer weighed 0.04 part and was found by analysis to contain 51.21% carbon and 7.49% hydrogen. This analysis corresponds to that calculated for an oxetan-3-one/isobutylene copolymer containing 3% by weight of isobutylene.

When the copolymer was heated on a metal block it showed signs of partial melting at 207° C., then hardened and showed no further melting as the temperature was increased to 315° C. Absorption in the infrared for the copolymer was observed at 3.38, 3.50, 5.74, 6.82, 6.95, 7.31, 7.73, 7.91, 8.12, 8.5 to 9.5, 10.10, 11.50, and 12.85μ. In comparison, homopolymer of oxetan-3-one of Example 1(A) showed no tendency to melt throughout the heating range to 300° C. and differed in detail in the observed infrared absorption spectrum.

The polymers of this invention have many of the utilities generally common to polymers. Thus, they may be solvent cast to films for decorative or protective purposes or melt spun or spun from solutions to fibers for use in fabrics and filters. When applied from solvent-based formulations, they can be used as adhesives or, particularly when crosslinked, as decorative and protective coatings. Conventional components such as stabilizers, antioxidants, plasticizers, pigments, etc., can be added to these various polymeric compositions as desired.

Since obvious modifications and equivalents in the invention will be evident to those skilled in the chemical arts, I propose to be bound solely by the appended claims.

The embodiments of the invention in which an exclusive property or privilege is claimed are defined as follows:

1. A linear solid polymer containing a plurality of the recurring units

2. A polymer of claim 1 consisting of a homopolymer of oxetan-3-one.

3. A polymer of claim 1 consisting of a copolymer of oxetan-3-one and a member of the group consisting of: aliphatic aldehydes; cyclic oligomers of aliphatic aldehydes; epoxides; oxetanes; cyclic formals; oxacyclopentanes; cyclic esters; and vinyl compounds which can be polymerized by a cationic catalyst.

4. A polymer of claim 1 consisting of a copolymer of oxetan-3-one and formaldehyde.

5. A polymer of claim 1 consisting of a copolymer of oxetan-3-one and trioxane.

6. A polymer of claim 1 consisting of a copolymer of oxetan-3-one and isobutylene.

7. The process for producing a polymer of claim 2 which comprises heating oxetan-3-one in the presence of a cationic catalyst at a temperature of about −20° C. to about +100° C. under a moisture-free atmosphere.

8. The process of claim 7 carried out in an inert diluent.

9. The process of claim 7 wherein the catalyst is boron trifluoride.

10. The process of claim 7 wherein the catalyst is triethyloxonium fluoroborate.

11. The process which comprises copolymerizing, in the presence of a cationic catalyst at a temperature of about −20° C. to about +100° C. under a moisture-free atmosphere, oxetan-3-one and a member of the group consisting of: aliphatic aldehyde; cyclic oligomers of aliphatic aldehydes; epoxides; oxetanes; cyclic formals; oxacyclopentanes; cyclic esters; and vinyl compounds which can be polymerized by a cationic catalyst.

12. The process which comprises copolymerizing, in the presence of a cationic catalyst at a temperature of about −20° C. to about +100° C. under a moisture-free atmosphere, oxetan-3-one and formaldehyde.

13. The process which comprises copolymerizing, in the presence of a cationic catalyst at a temperature of about −20° C. to about +100° C. under a moisture-free atmosphere, oxetan-3-one and trioxane.

14. The process which comprises copolymerizing, in the presence of a cationic catalyst at a temperature of about −20° C. to about +100° C. under a moisture-free atmosphere, oxetan-3-one and isobutylene.

15. A polymer of claim 1 in the form of a manufacture.

16. polymer of claim 2 in the form of a film.

17. A copolymer of claim 4 in the form of a film.

18. A copolymer of claim 5 in the form of a film.

References Cited

UNITED STATES PATENTS

| | | | |
|---|---|---|---|
| 2,891,837 | 6/1959 | Campbell | 18—54 |
| 3,112,280 | 11/1963 | Farthing et al. | 260—2 |
| 3,219,631 | 11/1965 | Kullmar et al. | 260—67 |
| 3,242,137 | 3/1966 | Findley | 260—63 |

OTHER REFERENCES

Marshall and Walker, Journal Chem. Soc. 1952, 467.

WILLIAM H. SHORT, *Primary Examiner.*

L. LEE, *Assistant Examiner.*